W. H. STROM.
BALL BEARING.
APPLICATION FILED JUNE 1, 1915.

1,194,679.

Patented Aug. 15, 1916.
2 SHEETS—SHEET 1.

Witnesses:

Inventor:
Walter H. Strom
By Dyrenforth, Lee, Chritton & Wiles,
Attys

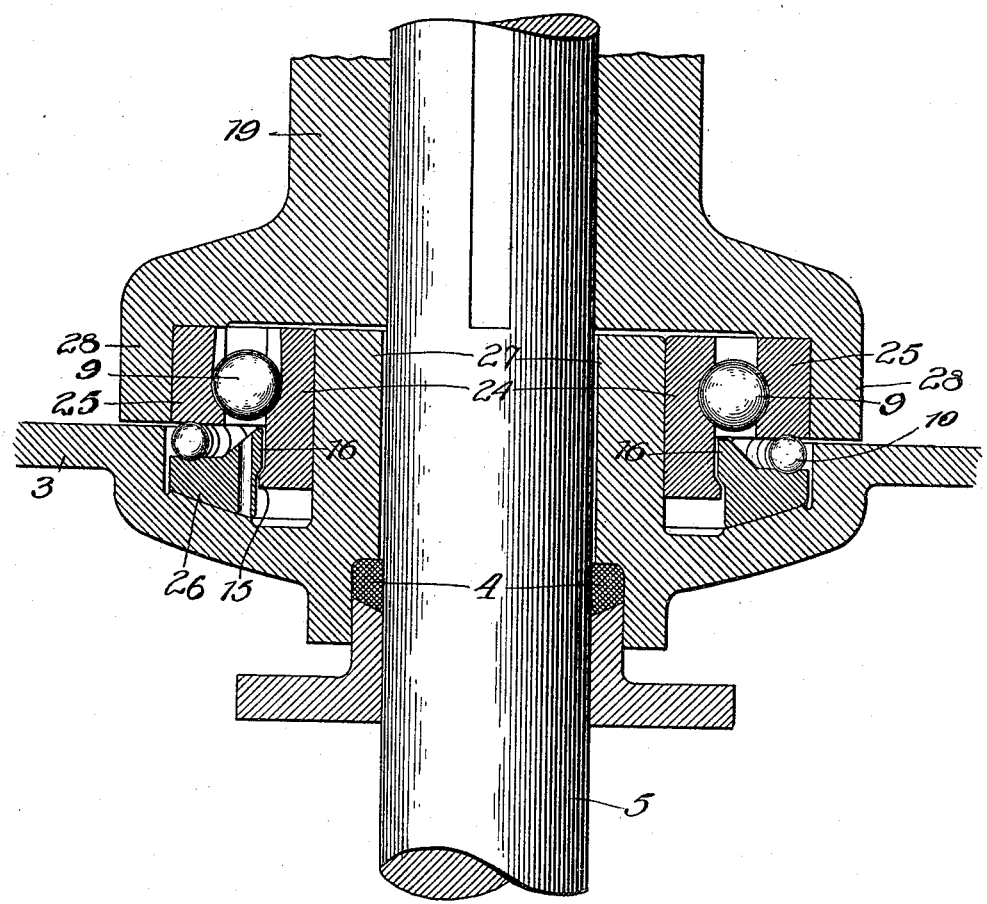

UNITED STATES PATENT OFFICE.

WALTER H. STROM, OF OAK PARK, ILLINOIS.

BALL-BEARING.

1,194,679.  Specification of Letters Patent.  Patented Aug. 15, 1916.

Application filed June 1, 1915. Serial No. 31,398.

*To all whom it may concern:*

Be it known that I, WALTER H. STROM, a citizen of the United States, residing at Oak Park, in the county of Cook and State of Illinois, have invented a new and useful Improvement in Ball-Bearings, of which the following is a specification.

My invention relates to improvements in the variety of ball-bearings wherein provision is made for sustaining radial loads and resisting end thrust.

My primary objects are to provide a bearing of the variety above stated which shall be self-contained or unitary, the balls locking together the several elements of the bearing, thus permitting it to be installed into operative position and withdrawn therefrom as a unit, and handled without disarrangement of its parts; to provide a bearing wherein wear of the balls or races, will not produce cramping of the balls or produce other conditions which will impair the bearing; to so form the bearing that disalinement of the parts of the structure with which it is intimately associated will be compensated for; and to provide for the ready disassembling of the elements of the bearing as may be required for purposes of repair or replacement.

Figure 1:
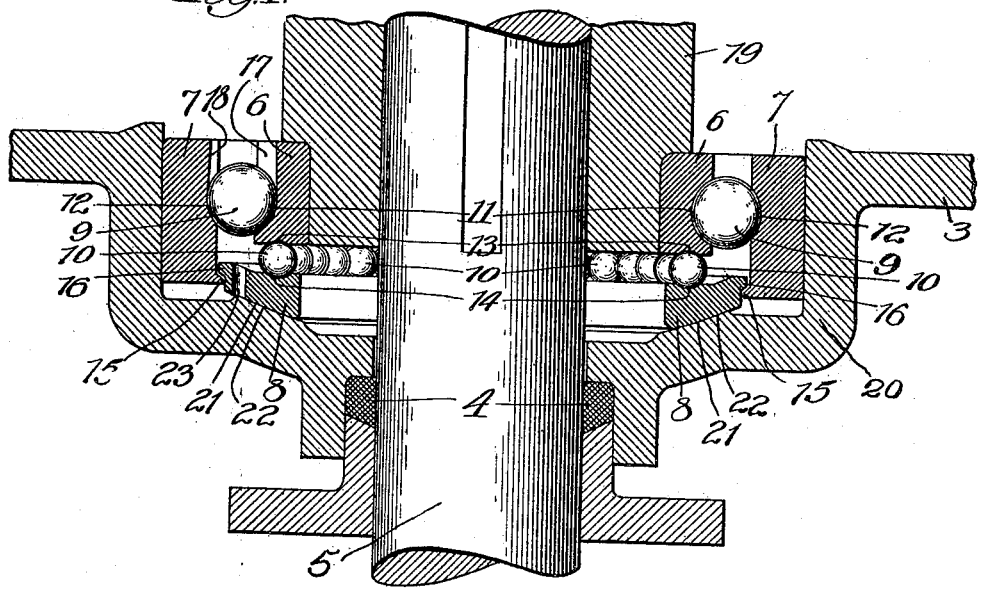
Figure 2:
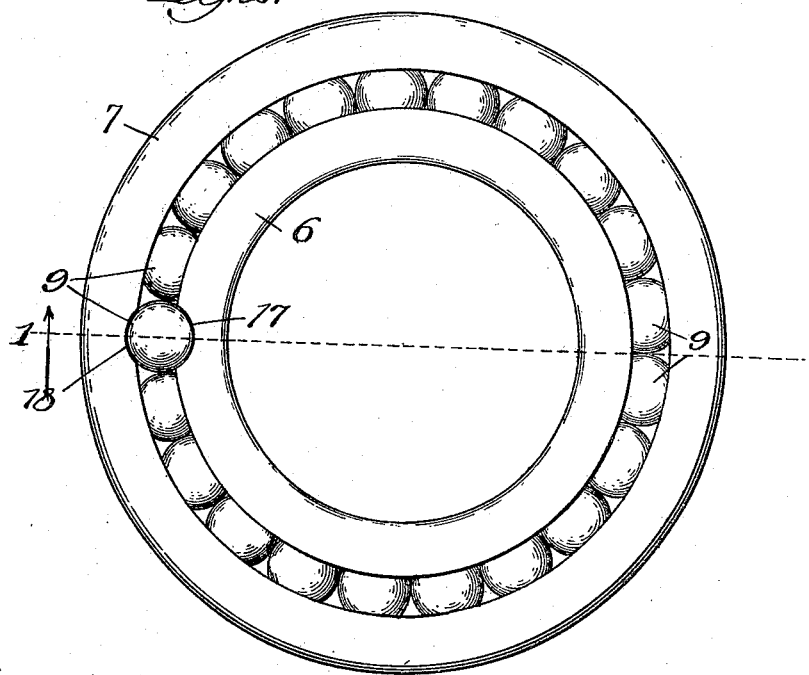

Referring to the accompanying drawings—Figure 1 is a broken view in vertical sectional elevation of a centrifugal pump, the shaft of which, disposed vertically, is supported in journaled position in the pump-casing on a ball-bearing of one of the forms in which my invention may be embodied. Fig. 2 is a plan view of the bearing of Fig. 1; and Fig. 3, a view similar to Fig. 1 of the pump structure of this figure, the shaft of which is supported in a bearing constituting a modification of the bearing of Fig. 1.

Referring more particularly to Figs. 1 and 2, the pump-casing, inclosing the drive-element (not shown) of the pump, is represented at 3. The shaft of the pump, which is driven by the drive-element thereof and is vertically disposed in the casing 3 and extends through the lower end of the casing where it is surrounded by a stuffing box 4, is represented at 5, and is supported in journaled condition in the casing on a ball-bearing constructed in accordance with my invention, this shaft being so disposed as to cause both end and radial thrusts to be exerted thereby against its bearing.

The ball-bearing referred to comprises three circular ball-race members 6, 7 and 8, and two series of balls 9 and 10 confined between these members. The race member 6 is provided about its periphery with a ball-race-forming groove 11 between which and a ball-race-forming groove 12 on the inner periphery of the member 7, the balls 9 for resisting radial thrust, are confined. The member 6 also contains in its lower face a ball-race-forming groove 13 between which and a ball-race-forming groove 14 provided on the upper surface of the member 8, the balls 10 which operate to resist end-thrust, are confined. The member 7 is provided about its inner periphery with an inwardly extending projection 15 which may be in the form of a continuous flange, and the member 8 is provided about its outer periphery with an outwardly-extending projection 16, which may be in the form of a continuous flange, which interlocks with the projection 15 as illustrated.

In assembling the race-members and balls, the member 8 is first inserted into the member 7 to rest at its projection 16 upon the projection 15; the balls 10 are then laid in the groove 14, and the member 6 inserted into the member 7 to rest at its groove 13 upon the balls 10, whereupon the balls 9, are introduced into the space between the members 6 and 7, to engage the races 11 and 12. To permit the balls 9 to be so positioned, the inner and outer peripheries of the members 6 and 7 are recessed as indicated at 17 and 18, respectively, these recesses being of such depth, that, when opposed, as shown in Fig. 2, the diameter of the opening therebetween will be slightly less than the diameter of the balls 9, but of sufficient size, that by pressing against the balls when positioned in these recesses, the members 6 and 7 may be sprung sufficiently to permit the balls to pass through the opening formed between these recesses and enter between the races 11 and 12. It will thus be understood that, when the members 6, 7 and 8 and balls 9 and 10 are assembled, as stated, these several elements will become interlocked with each other and form a unitary self-contained bearing which may be handled at will without danger of disarrangement.

In the arrangement illustrated, the member 6 is shrunk or otherwise rigidly secured to a sleeve 19 secured to, and revoluble with, the shaft 5, the member 7 fitting within the reduced end-portion 20 of the casing 3 and being free to move longitudinally therein, and the member 8 bearing at its lower face, preferably of spherical form, as represented at 21, against the inner side of the casing which is correspondingly shaped as represented at 22.

The balls 9 and 10 are provided to resist radial and end-thrusts, respectively, as hereinbefore stated. Should any of the race-forming grooves or balls become worn, the race-members will automatically adjust themselves relative to each other and to the balls to preserve to the balls 9 and 10, their single functions of resisting radial and end-thrusts, respectively, thus preventing cramping of the balls and preventing undue wear, or impairment. Thus for example, should the balls 10 or races 13 or 14 become worn, the shaft 5 will settle proportionately, and lower the race 11, the member 7, however, being free to lower, it will adjust itself to a position in which the balls 9 will run freely in their races, without end thrust thereon, or should either of the races 11 or 12, or the balls 9, become worn, the member 7 automatically shifts to prevent end thrust on the races for these balls or on the latter, the members 6, 7 and 8 being so proportioned, as shown, that when the balls are assembled therewith, the interlocking projections 15 and 16 will be slightly spaced apart to permit of the desired freedom of movement of these members relative to each other.

The feature of forming the member 8 with the spherical surface 21 and the casing with the coöperating surface 22 of similar shape, is of advantage, though not essential to the carrying out of my invention, in that should the shaft 5 become slightly disalined, the member 8 may shift relative to the casing and torsional thrusts on the bearing will be prevented.

The balls and race-members may be readily disassembled by shifting the balls 9, in succession, into registration with the opposed recesses 17 and 18 in the members 6 and 7 and forcing them out of the races, by inserting a pin (not shown), into an opening 23 in the member 8 and driving it against the balls, the balls thus springing past the members 6 and 7.

Referring now to Fig. 3, I have shown a modification of the bearing of Figs. 1 and 2 in connection with a pump, as explained of Figs. 1 and 2. In this construction, the ball-race members are transposed and are indicated at 24, 25, and 26, these ball-race members corresponding with the members 7, 6 and 8, respectively, the projection 15, for the interlocking purpose hereinbefore explained being provided in this arrangement on the outer periphery of the ball-race member 24, and interlocking with the projection 16 on the inner periphery of the ball-race member 26. The ball-race member 24 in this arrangement surrounds, and is slidable lengthwise on, a boss 27 on the casing 3 and surrounding the shaft 5 of the pump, and the member 25 fits within the confines of an annular depending flange 28 on the lower end of the collar 19, the collar bearing at its lower end upon the ball-race member 25 and being preferably spaced from the member 24, as shown. Thus end-thrust exerted against the bearing will be resisted by the balls 10 only, the balls 9 at all times sustaining only radial thrust as the member 24 is free to shift lengthwise should wear of the parts occur. If desired, the race 8 of Fig. 1 and the race 26 of Fig. 3 may be integral with the part 3.

I have chosen to illustrate my improved bearing as applied to a pump of the character shown, because of the conditions of radial and end-thrusts therein presented, but it will be readily understood that it may be used in any situation wherein the bearing is required to resist radial and end-thrusts, as for example, in automobile-wheel constructions. Furthermore, various modifications and alterations of the structures illustrated may be made without departing from the spirit of my invention.

What I claim as new and desire to secure by Letters Patent, is:—

1. A ball-bearing comprising, in combination, three balls confined between races on two of said members, and a second series of balls confined between a race on one of said two referred-to ball-race members and a race on the third one of said members and interlocking these members together, the other of said two members and said third member interlocking, whereby a unitary three-part bearing is provided.

2. A ball-bearing comprising, in combination, three ball-race members, a series of balls confined between races on two of said members, a second series of balls confined between a race on one of said two referred-to ball-race members and a race on the third one of said members and interlocking these members together, and a projection on said third member interlocking with the other of said two members whereby a unitary three-part bearing is provided.

3. A ball-bearing comprising, in combination, three ball-race members, a series of balls confined between races on two of said members, a second series of balls confined between a race on one of said two referred-to ball-race members, and a race on the third one of said members and interlocking these members together, and a continuous flange on said third member interlocking with the other of said members, whereby a unitary three-part bearing is provided.

4. A ball-bearing comprising, in combination, three ball-race members, a series of balls confined between races on two of said members, and a second series of balls confined between a race one of said two referred-to ball-race members and a race on the third one of said members and interlocking these members together, the other of said two members and said third member interlocking, whereby a unitary three-part bearing is provided, the parts of the bearing being so proportioned as to provide a clearance between said two last referred-to members to permit said third member to shift lengthwise of said members, except as restrained by said second-named series of balls.

5. A ball-bearing comprising, in combination, three ball-race members, a series of balls confined between races on two of said members, a second series of balls confined between a race on one of said two referred-to ball-race members and a race on the third one of said members and interlocking these members together, and a projection on said third member interlocking with the other of said two members whereby a unitary three-part bearing is provided, the parts of the bearing being so proportioned as to provide a clearance between said two last referred-to members to permit said third member to shift lengthwise of said members, except as restrained by said second-named series of balls.

6. In a self-contained ball-bearing, the combination of a plurality of members presenting two sets of ball-retaining grooves and series of balls confined between said sets of grooves, respectively, the walls of the grooves of one set at opposed portions being cut away to present a recess of less width than the diameter of the balls therebetween whereby the balls are inserted into engagement with the last-referred to set of grooves by springing them past said walls, said bearing containing a pin-receiving opening registering with the space between said last-referred to set of grooves and opening through the bearing at the side thereof opposite to that containing said recesses.

WALTER H. STROM.

In presence of—
L. HEISLER,
A. C. FISCHER.

Copies of this patent may be obtained for five cents each, by addressing the "Commissioner of Patents, Washington, D. C."